Oct. 15, 1929.  M. MÉE  1,732,104
AUTOGRAPHIC MACHINE
Filed July 29, 1927  11 Sheets-Sheet 1

INVENTOR
Marcel Mée

Oct. 15, 1929.  M. MEE  1,732,104
AUTOGRAPHIC MACHINE
Filed July 29, 1927   11 Sheets-Sheet 2
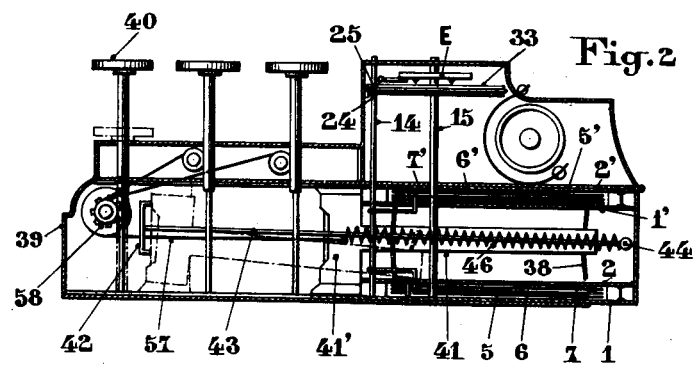
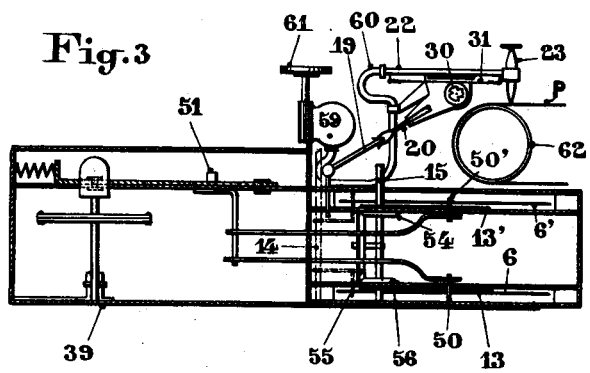
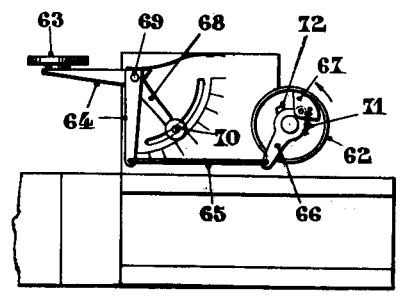
INVENTOR
Marcel Mée

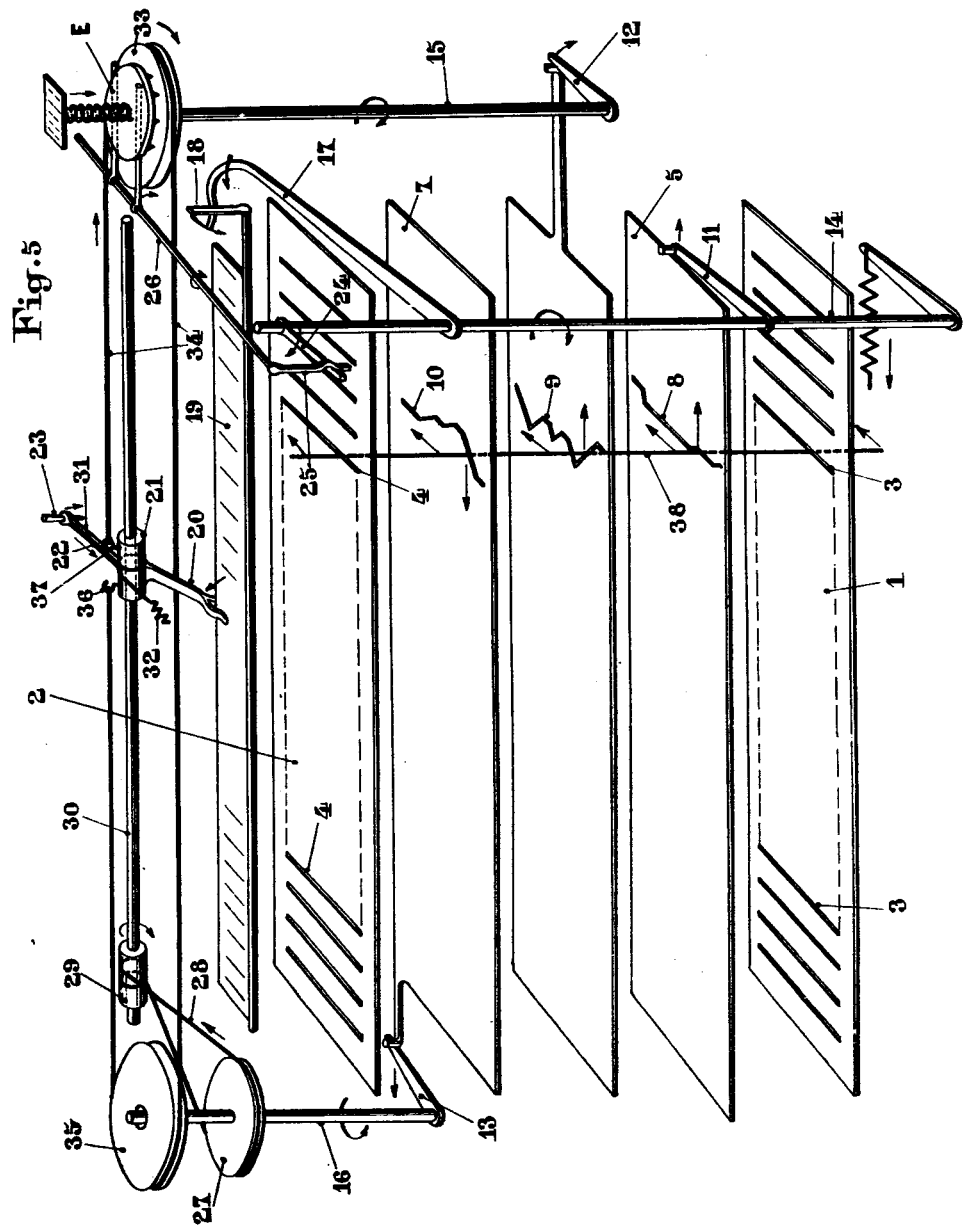

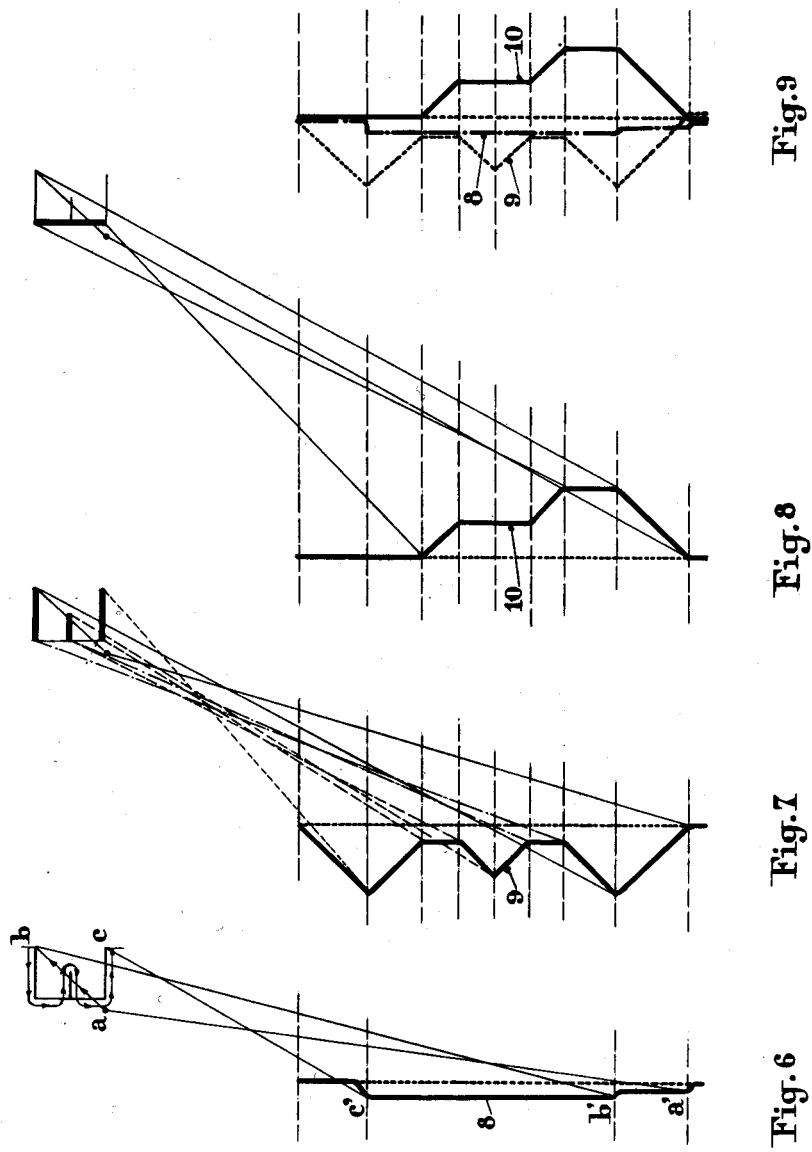

Oct. 15, 1929.  M. MÉE  1,732,104
AUTOGRAPHIC MACHINE
Filed July 29, 1927  11 Sheets-Sheet 5
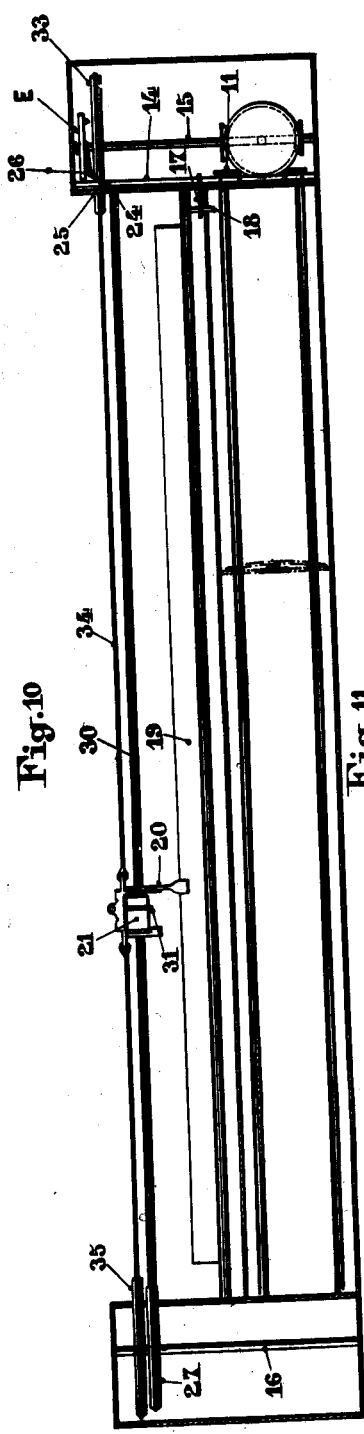
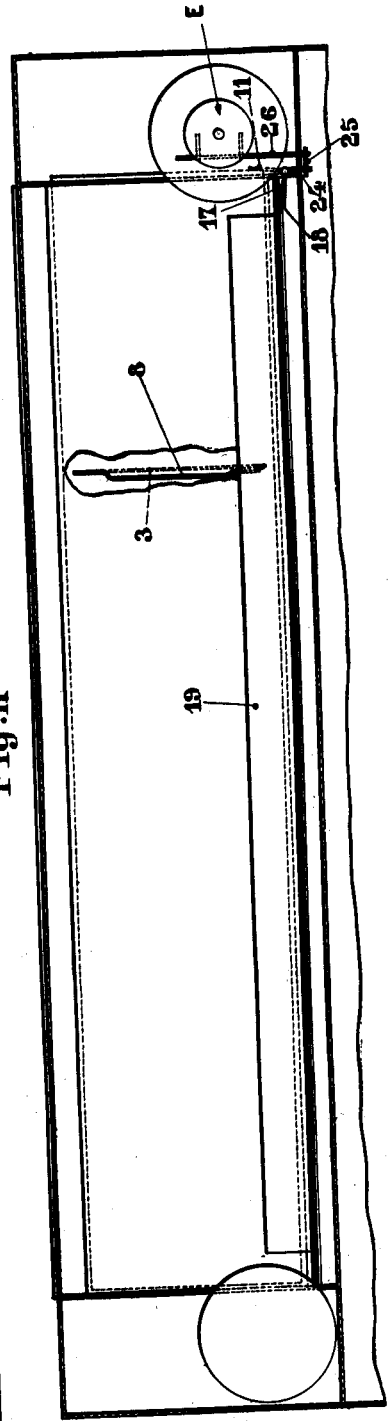
INVENTOR
Marcel Mée Oct. 15, 1929.                M. MÉE                 1,732,104
                        AUTOGRAPHIC MACHINE
                        Filed July 29, 1927        11 Sheets-Sheet 6
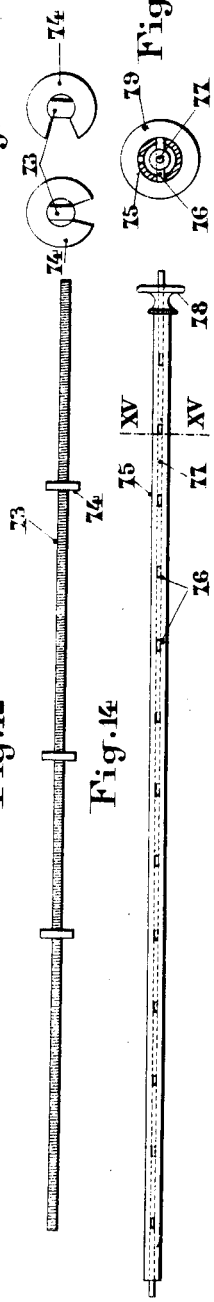
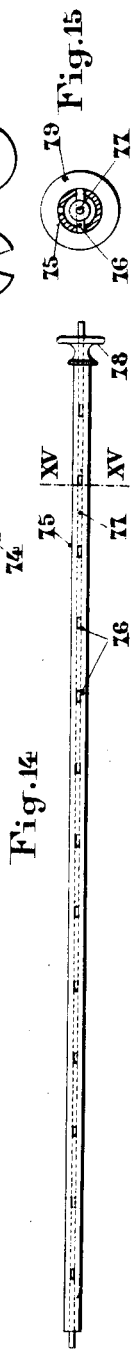
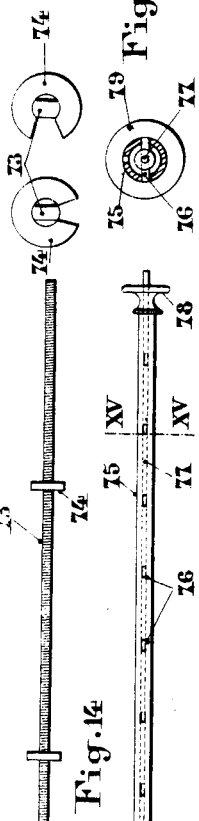
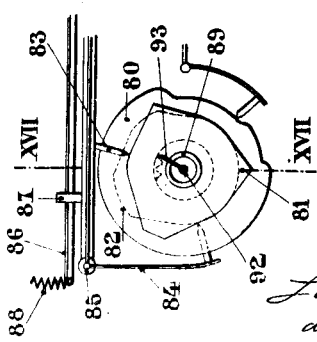
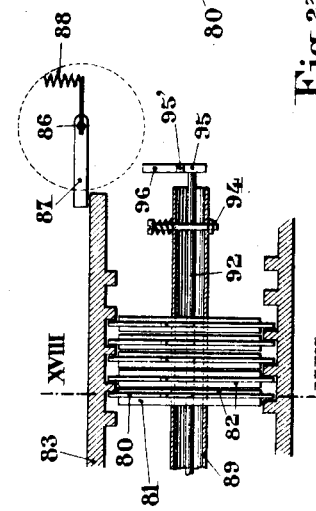
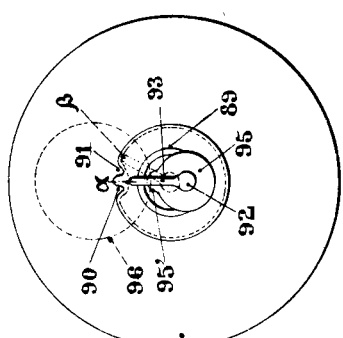
INVENTOR
Marcel Mée
by
Langner, Parry, Card,
and Langner Attys.

Oct. 15, 1929.  M. MÉE  1,732,104
AUTOGRAPHIC MACHINE
Filed July 29, 1927  11 Sheets-Sheet 7

INVENTOR
Marcel Mée

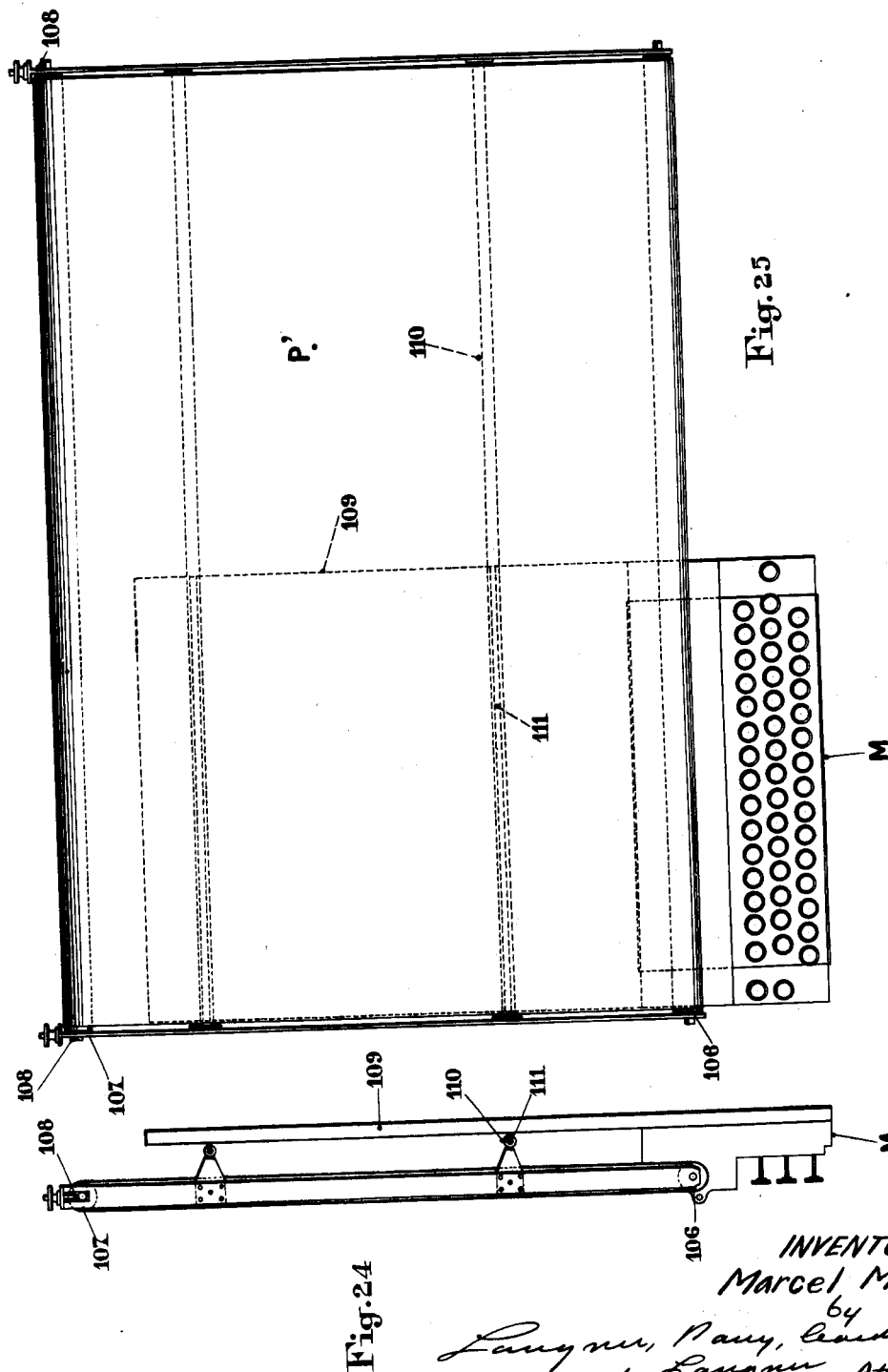

Oct. 15, 1929.  M. MÉE  1,732,104
AUTOGRAPHIC MACHINE
Filed July 29, 1927  11 Sheets-Sheet 9

INVENTOR.
Marcel Mée
by
Langner, Parry, Card and Langner
Att'ys.

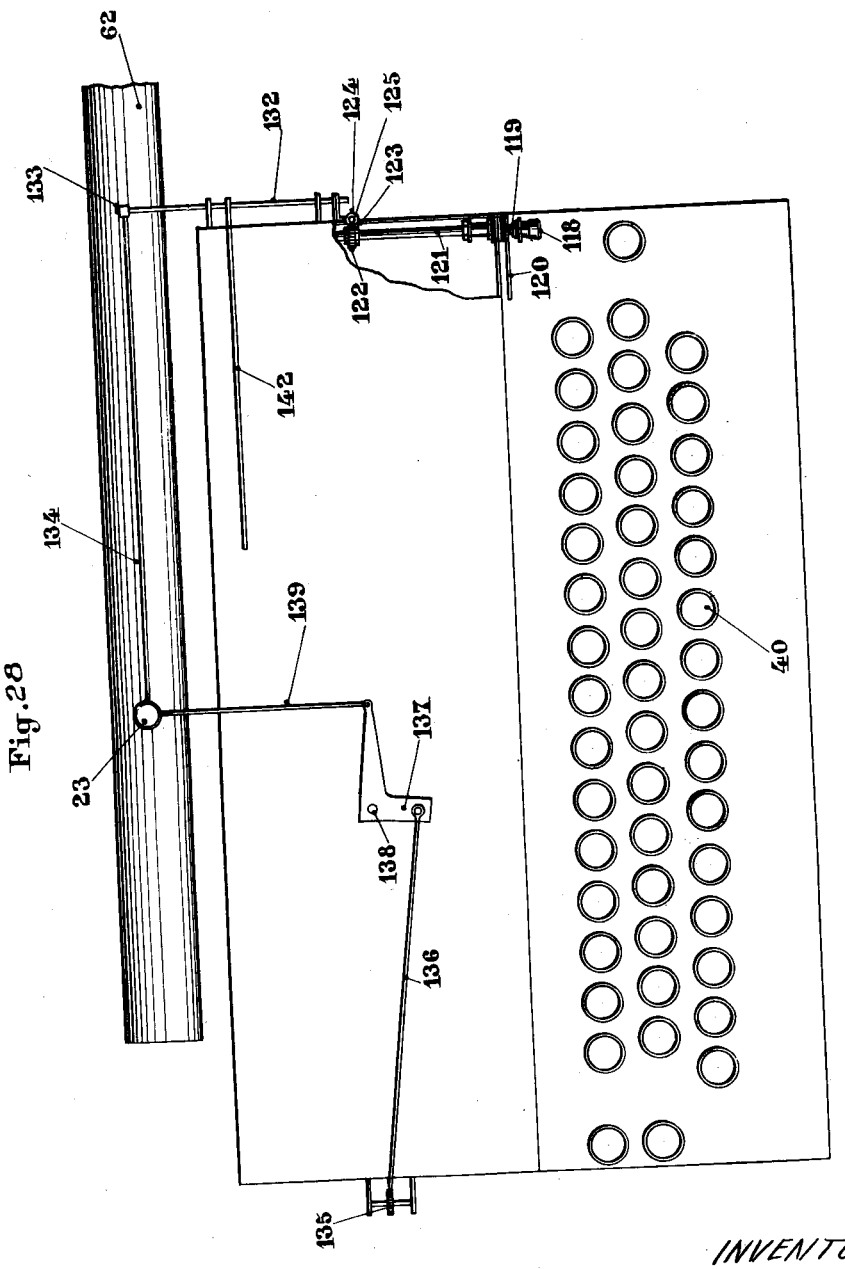

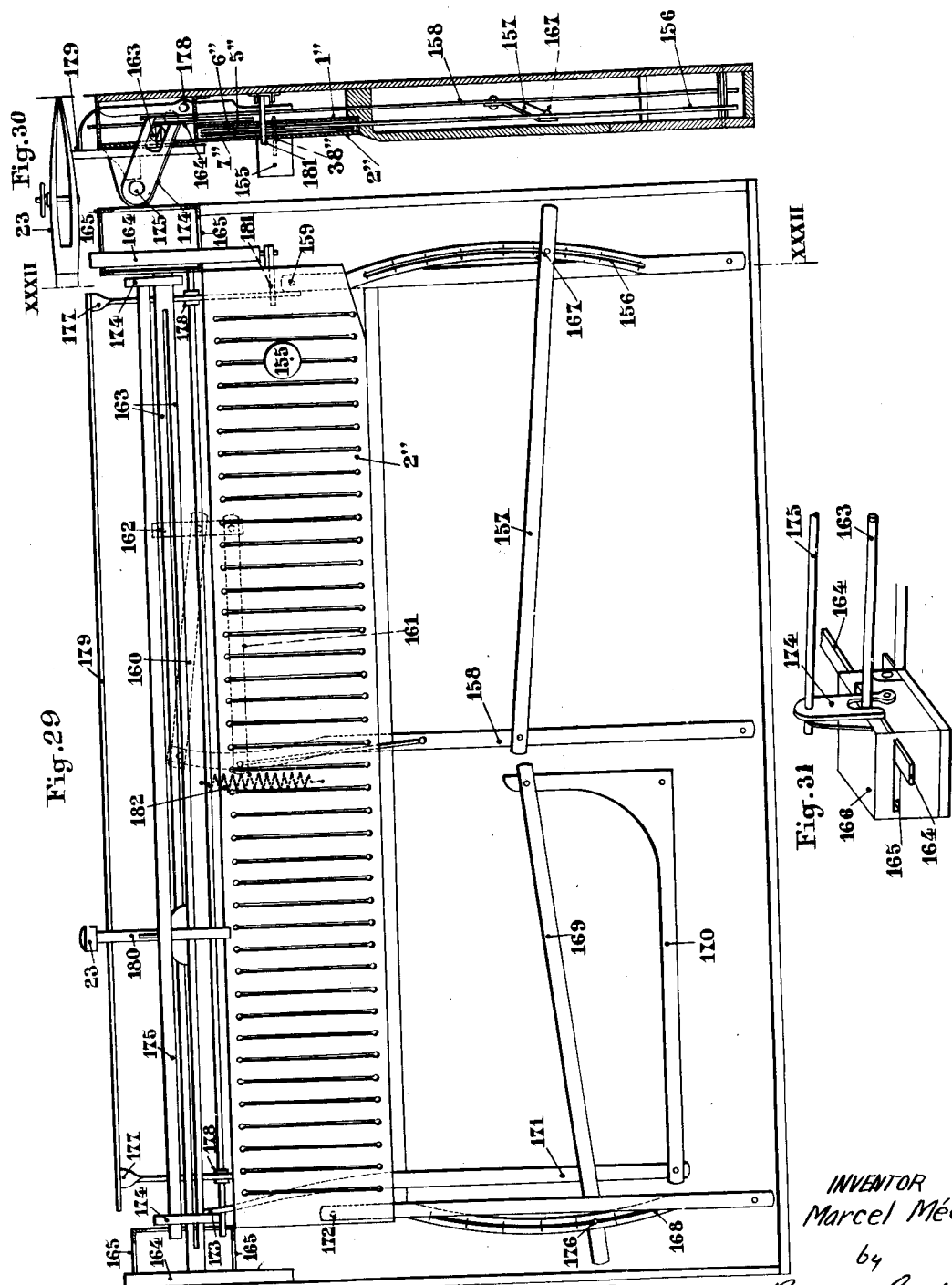

Patented Oct. 15, 1929

1,732,104

UNITED STATES PATENT OFFICE

MARCEL MÉE, OF PARIS, FRANCE

AUTOGRAPHIC MACHINE

Application filed July 29, 1927, Serial No. 209,319, and in France September 30, 1926.

The present invention has for its object a machine for making graphical symbols, designs and the like, the operation being performed mechanically for each character through the simple movement either of a key, when using a keyboard type of machine, or of a needle sliding smoothly along a guiding groove when using a simplified type of machine.

Therefore this machine permits of making in an entirely mechanical manner the symbols, etc. . . . which are nowadays made by hand only by expert draftsmen. Mainly, this machine can be used to great advantage whenever it is required to make these symbols, etc., on the original drawings which are used for reproducing purposes by lithographers, engravers, drawing offices, etc. The more the symbols to be made are of an elaborate design, the greater is the saving obtained in expert labor, as for instance, in the case of classical types of letters such as the roman, the gothic or any other fancy type.

In the strict sense the machine forming the subject of the invention is an actual writing or drawing machine in the sense that it writes, that it traces the symbols, etc., in the manner as though they were made by hand. It is therefore clearly distinguished on this point of view from typewriters universally known under the name of writing machines and which are actually printing machines because the letters or signs are formed by the impact of a character in relief which has been suitably inked.

The machine is provided with devices enabling, by an extremely simple operation, to vary at will the types of the symbols, etc. . . . to be traced, the dimensions of the symbols and the ratio of these dimensions so as to produce a practically unlimited range of the types and sizes of the symbols, etc.

The invention also relates to a simplified modification of the machine in which the keyboard with multiple keys is eliminated, the tracings being effected by the movement of a single button.

In the accompanying drawings, there are illustrated diagrammatically and solely by way of example forms of construction of the machine forming the subject of the invention.

Figures 2 and 3 show respectively sections on the lines II—II and III—III of Figure 1.

Figure 4 is a partial end view of the right hand side of Figure 1.

Figure 5 is a diagram adapted to elucidate the general feature of the machine and the method of operation of the movement of the tracing member.

Figures 6 to 9 are diagrams showing by way of example the outlines of the cam grooves necessary for tracing the letter E.

Figure 6 shows the outline of the cam groove for contact and clutching.

Figure 7 shows the outline of the cam groove for producing the horizontal movement of the tracing member.

Figure 8 shows the outline of the cam groove for producing the vertical movement of the tracing member.

Figure 9 finally shows the combination of these three cam grooves as carried out in the machine for tracing the letter in question.

Figure 1:
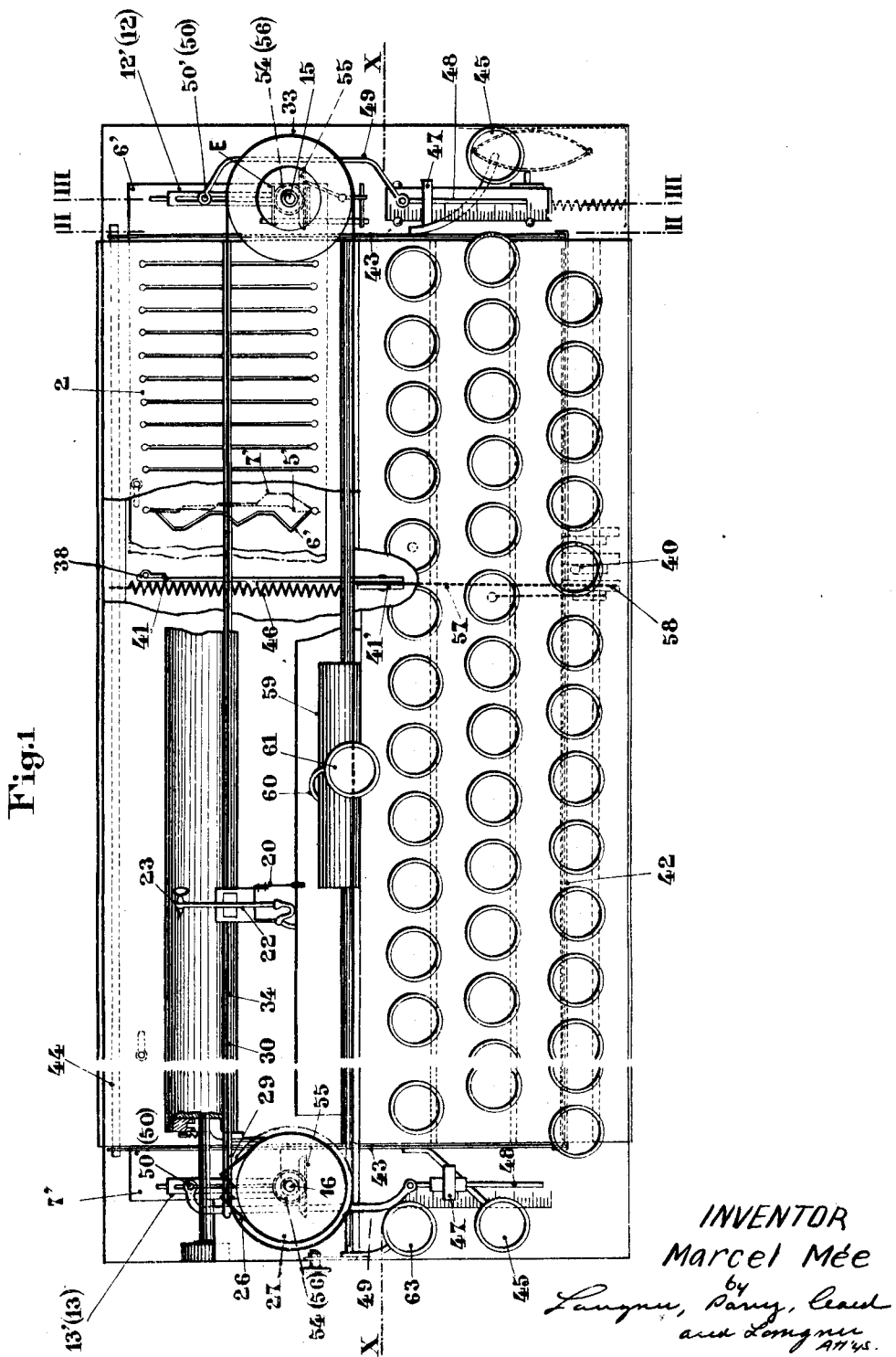
Figure 1 is a plan view of the machine partly broken away.

Figure 10 is a section on the line X—X of Figure 1, some of the members being removed so as to render the drawing clearer.

Figure 11 is a plan view of the rear portion of the machine, the cover being removed and a portion being broken away so as to enable the cam groove to be seen.

Figure 12 shows a tabulating device.

Figure 13 shows to a larger scale one of the washers adapted to be mounted on the rod of the tabulator in two positions.

Figure 14 shows a modification of the tabulating device.

Figure 15 is a section to a larger scale on the line XV—XV of Figure 14.

Figure 16 is a front view showing a cam device of general circular contour, which cams may replace the cam grooves above referred to, this device forming a modification of the invention.

Figure 17 is a section on the line XVII—XVII of Figure 16.

Figure 18 is a section to a larger scale on the line XVIII—XVIII of Figure 17.

Figure 19:
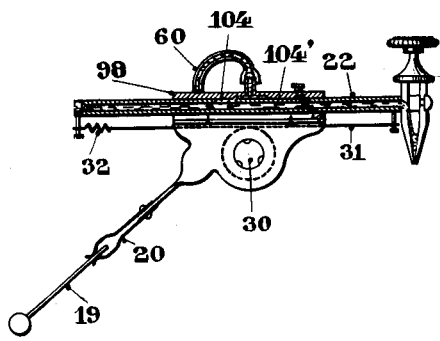

Figure 19 is a section of the stylus or tracing member and of the device serving to supply it with ink.

Figure 20:
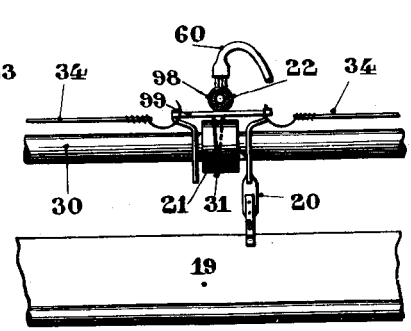

Figure 20 is a front view of the feed device, the stylus being removed.

Figure 21:
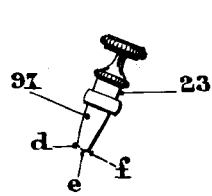

Figure 21 shows to a larger scale the tracing member in detail.

Figure 22:
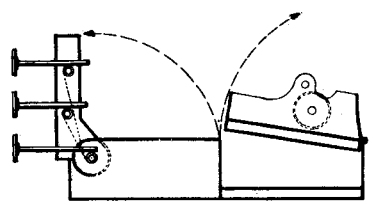

Figures 22 and 23 show, in vertical section and plan respectively, the general arrangement of the machine for enabling ready access to the internal members.

Figures 24 and 25 show in side elevation and plan respectively a device for writing on sheets of paper of any suitable width greater than the width of the machine.

Figure 26:
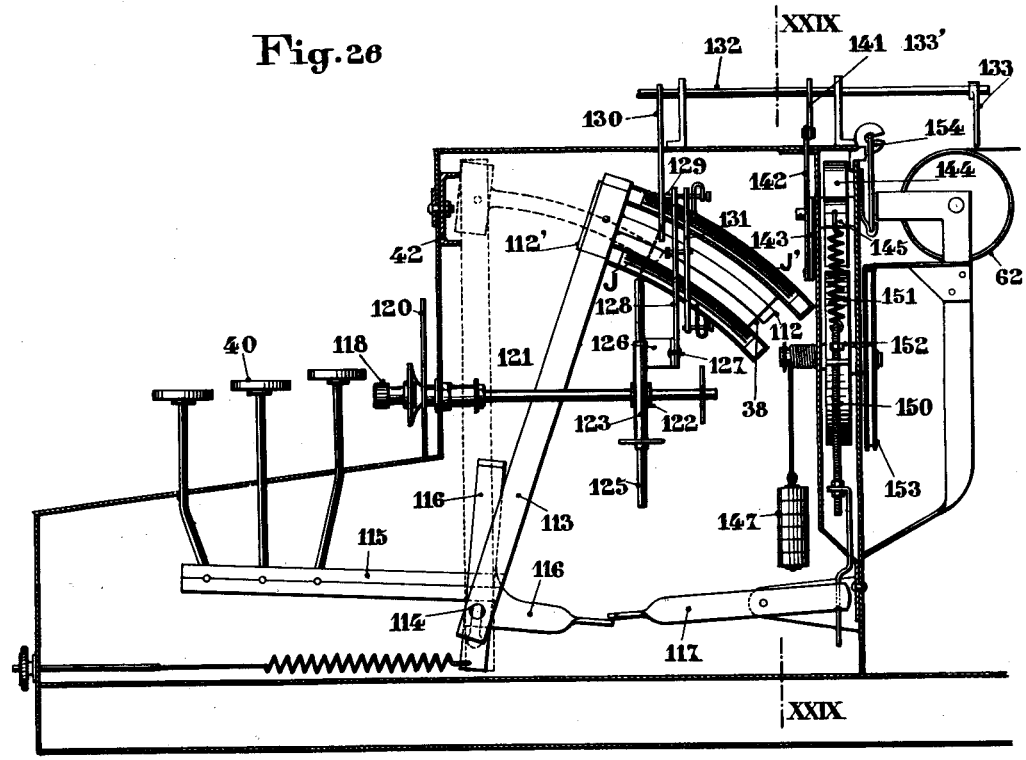

Figure 26 is a vertical section of a modification of the machine.

Figure 27:
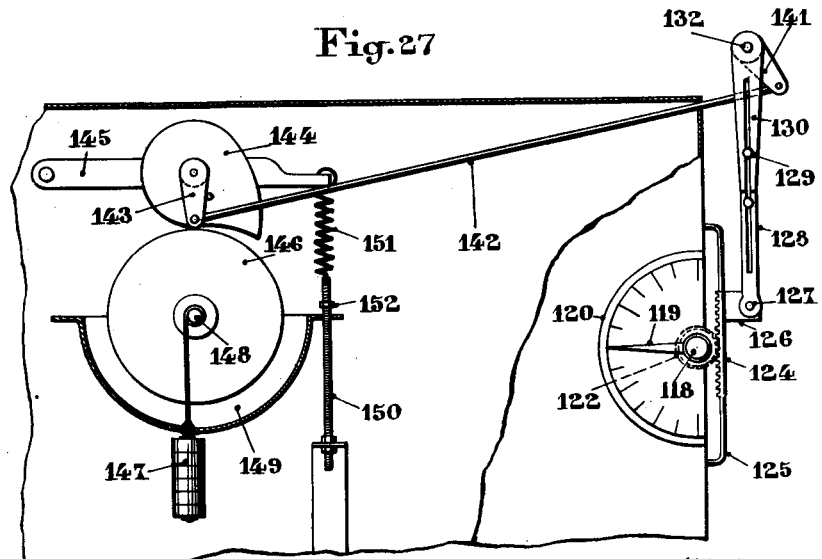

Figure 27 shows a section on the line XXIX—XXIX of Figure 26 of the details of this modification.

Figure 28 is a plan view with a portion broken away of the machine shown in Figure 26.

Figure 29 is a plan view (the cover being removed) of a simplified modification in which the keyboard is omitted.

Figure 30 is a section on the line XXXII—XXXII of Figure 29, and

Figure 31 is a perspective view showing a detail of this machine.

The machine comprises the combination of the following members or groups of members:

A keyboard, a set of pairs of needles (one pair for each key), the needles of each pair being connected to the corresponding key of the keyboard in such a manner that the lowering of this key produces a straight line movement of the needles then one of the needles of the pair engages with a system of cam grooves and guide grooves and finally, during the upward movement of the key, the needle thus brought into position is moved parallel to itself under the action of a return spring which produces the necessary movements of the tracing member; a system of plates some of which are provided with straight line guiding grooves, the others with grooves of varied outline corresponding to each of the letters or each of the signs to be traced, with which grooves engage the said needles, a connection formed between the plates provided with the cam groves and the tracing member, said connection being arranged in such a manner that the movements of the cams produced by the movement of the needles parallel to themselves determine a movement of the point of the tracing member corresponding to the outline of the letter or the sign which it is desired to write; a device adapted to ensure the continuous supply of ink to the tracing member; a mechanism permitting, by the simple movement of an operating lever, of producing an enlargement or a reduction of the letter or sign which is traced in the direction of their height; a similar mechanism permitting of producing an enlargement or a reduction, in the direction of width, of the letter or sign which is traced.

The general means, which constitutes an essential feature of the invention and which permits of obtaining a tracing of the letter or the sign in starting with a straight line movement, consists of the combination of a set of plates in which are cut open slots forming cam grooves and guiding grooves. Figure 5 shows entirely diagrammatically how this general means is carried into effect. In this figure, in order that the device may be more readily understood, it is assumed that the various plates referred to are spaced one from the other. The cam grooves illustrated in Figure 5 (and of which the outline is shown in Figures 6 to 9) correspond with the outline of the letter E, in straight stroke writing, taken as an example.

As shown in Figure 5 the system consists of two guide plates 1 and 2 in which are traced straight line parallel grooves 3 and 4 forming guide grooves. The plates 1 and 2 are secured in an invariable manner in the framework of the machine. Each of these plates is provided with a number of grooves equal to that of the keys of the keyboard.

Between the plates 1 and 2 are disposed three plates 5, 6 and 7 in which are cut open cam grooves 8, 9 and 10. Each of these plates 5, 6 and 7 is provided, as is well understood, with a number of grooves equal to that of the keys of the keyboard, each of these grooves corresponding with the outline of a letter or of a sign and consequently having a different outline to that of the adjacent grooves.

The plates 5, 6 and 7 are connected, for example by means of cranks 11, 12 and 13 to shafts 14, 15 and 16, each crank being keyed to the corresponding shaft. The shaft 14 carries a crank 17 keyed thereto and acting by means of its free end upon the finger 18 secured to a plate 19 serving to produce at opportune moments, by means of the arm 20, the drum 21 and the arm 22 (the arm 20, the drum 21 and the arm 23 being secured together), the lowering or the raising of the tracing member 23. The same shaft 14 carries another crank 24 keyed thereto, of which the free end acts upon a finger 25 secured to a shaft 26 which operates the clutch device E.

The plate 7, when moved in the manner hereinafter described, acts on the crank 13 in such a manner as to produce the rotation of the shaft 16. To this is keyed a pulley 27 around which passes a funicular transmission 28 wound on a drum 29 keyed to the same shaft 30 as the drum 21 above referred to. When the pulley 27 rotates it produces the rotation of the drum 29 and consequently of the shaft 30 and of the drum 21. On this latter is wound a funicular transmission 31 which produces, when the pulley 27 rotates, the movement of the tracing member 23 towards the front or towards the rear, the spring 32 ensuring the tension of the transmission.

The device designated by E in Figure 5 serves to produce the movement of the tracing member 23 in the longitudinal direction, that is to say parallel to the shaft 30. This movement is actuated by the movement of the plate 6, which movement causes the shaft 15 to rotate and therewith the pulley 33 around which passes a thread 34 passing around the loose pulley 35. The ends of the thread 34 are attached at 36 and 37 to the drum 21 movable along the shaft 30 but always driven by this during its rotation by reason, for example, of a grooved device.

The transmission 34 only acts on the drum 21 for moving it in the longitudinal direction when the device E is clutched. This clutching, which is produced when bearing upon one of the keys of the keyboard, through the medium of the plate 5 and the members 11, 14, 24, 25 and 26, produces the movement of the drum 21 by the action of the rotation of the pulley 33.

The tracing of each letter or sign is obtained by the combination of the movement of the tracing member 23 produced, as stated above in two directions set at a right angle to each other.

With each of the keys of the keyboard corresponds a stem 38 which engages in the corresponding grooves 3, 8, 9, 10 and 4 of the said superposed plates.

In order that the method of operation of the device may be more readily understood reference is made to the diagrams of Figures 6 to 9 which show the part played by the plates 5, 6 and 7 in the formation of the letter E taken by way of example. When bearing on the key of the keyboard marked E the corresponding stem 38 moves along the guide groove 4 without engaging with the grooves 10, 9, 8 and 3. When it has reached the end of its stroke and during the return of the key, a return spring draws it rearwardly. At the same time, in the manner to be described hereinafter, the stem in question engages in the grooves 10, 9, 8 and 3. This movement of the stem 38 produces the movement of the intermediate plates 5, 6, 7, the movement of each of these plates being determined by the outline of the corresponding groove (8, 9 or 10), which outline corresponds with the letter or sign of the key in question. The first effect of the movement of the stem 38 is to produce clutching of the device E. From this moment the movements of the plates 6 and 7 determine the corresponding movements of the drum 21 and consequently of the tracing member 23, these movements corresponding with the outline of the grooves 9 and 10, that is to say in the example in question, with the outline of the letter E. Figure 6 shows the path traversed by the tracing member under the action of the said operating members.

The tracing member starts at the point $a$ (the stem 38 being then at the point $a'$ of the groove 8) and follows the course indicated by the arrows in Figure 6. When the said member traverses the line $a$, $b$, it is held separated from the paper. At the moment when it arrives at $b$ (the stem 38 then arriving at $b'$), the shape of the groove 8 produces the lowering of the tracing member which comes into contact with the paper. The letter is then formed as indicated by Figures 6 to 8, the contact again ceasing at the moment when the stem 38 has reached $c'$, the tracing member having arrived at the point $c$.

It will be understood that the operation of the system is the same for all the letters or signs which the machine should be capable of tracing. The outline of the grooves 8, 9 and 10 alone varies, this outline being determined for each letter or sign in a manner to produce the appropriate movements of the tracing member.

Figures 1 to 4 show diagrammatically how the device described is applied so as to constitute a complete machine. This machine is provided with a framework 39 enclosing the members and on the front portion is formed a keyboard of which each key 40 corresponds, as in an ordinary typewriter, to a letter or sign. In Figures 1 to 4 the figures indicate the same members as on the diagram of Figure 5.

Figure 2 shows more particularly how the operating device for the stems 38 is arranged. Each of these stems is secured to a sliding member 41 terminated at its front portion by a head 41' and the whole is capable of oscillating, when the head, at the end of its stroke, meets a stop 42.

This device is adapted to permit of obtaining by simple means, the outline of the capital letters, small letters or different signs. For this purpose the machine is provided with two sets of plates 1, 2, 5, 6, 7 and 1', 2', 5', 6', 7', the first of these sets corresponding for example, to the capital letters and the second to the small letters.

The stop 42 which extends along the whole length of the machine (see Figure 1), is carried by stems 43 and oscillates about the axis 44. In acting on one of the keys 45 (Figure 1), it is possible to bring the stop 42 either into its upper position, as in Figure 2, or into its lower position. According as to whether it occupies one or other of these positions it produces, when the head 41' comes into contact therewith, the oscillation of the said head either downwardly (as indicated by chain dotted lines in Figure 2) or upwardly. This oscillatory movement of the member 41, 41' causes the corresponding stem 38 to engage either with the grooves of the plates 1, 2, 6, 7, or with those of the plates 1', 2', 5', 6', 7'. Consequently on the return of the member 41, 41' and of the corresponding needle 38 under the action of the return spring 46, the plates 5, 6, 7 or 5', 6', 7' according to the case, are set in operation and produce the movements of the tracing member 23 necessary for forming the letter or sign in question.

The machine is provided with a device permitting of varying at will either the width or the height of each letter. The device enabling the height of the letters to be varied is, for example, placed at the left of the machine, whilst the device for enabling the width of the letters to be varied is mounted at the right.

These two devices are similar. It will therefore suffice to describe one, that on the left, for example. This device is arranged in the following manner. A slider 47 movable along the stem 48 produces, through the medium of the stem 49, the movement of a shaft 50' movable in a guide groove provided in the crank 13' (or 12' for the device on the right). This crank is secured to a bevel pinion 54 lose on the shaft 16 (or on the shaft 15 for the device on the right) and gearing with another bevel pinion 55 which, in turn, gears with a pinion 56 loose on the shaft 16 (or 15 for the device at the right) and secured to another crank 13 (or 12 for the device on the right) (Figure 3). This arrangement of pinions forms a differential system.

When the machine operates with the set of plates 5, 6, 7, the shaft 50 moves in the groove of the crank 13 similar to the shaft 50'. In this case the differential system operates in the reverse direction.

By approaching or withdrawing the shaft 50' from the axis of rotation 16 of the pulley 27 the amplitude of the movement of rotation of this pulley is modified by reason of the action of the movement imparted to the plate 7' by the guide grooves. Consequently the stroke in the direction of height of the tracing member 23 is increased or reduced. The slider 47 moves in front of the graduated scale which enables the result obtained to be determined with precision and to repeat it every time that this is necessary.

The device on the right is similar to that which has been described. In Figure 1 a crank 12' (or 12) corresponds to the crank 13' (or 13) of the first device. In this device on the right, when the shaft 50' (or 50) is moved, the angle through which the crank 12' (or 12) turns, for a given movement of the plate 6', varies. Consequently the pulley 33 turns through a larger or smaller angle which produces a more or less large longitudinal movement of the tracing member 23 through the medium of the transmission 34. It is thus possible to vary the width of the letter.

The same device enables the spacing between the letters to be varied. It may first be mentioned that the tracing member is automatically brought to the starting point corresponding with the succeeding letter when the tracing of the preceding letter has been completed.

The movement towards the front of the members 41, 41' controlled by the lowering of the keys may be obtained in any suitable manner. In the form of construction of the invention illustrated this movement is controlled by each key by a thread 57 attached to the head 41' of the corresponding member and passing around a pulley 58 to which a rotary movement is imparted, for example by means of a rack and pinion system, when the key 40 is lowered.

The tracing member 23 is supplied with ink from a smaller container 59 to which it is connected by a flexible tube 60. The container 59 is provided with a piston device actuated by a key 61 and enabling the ink to be supplied to the tracing member when this is necessary.

The paper P on which the machine traces the letters or signs is wound as in an ordinary typewriter, around a roller 62. Figure 4 shows a method of construction of the device for producing the rotation of the roller 62 for changing the line. This device is operated by a key 63 which, by means of a bent lever 64, produces, through the medium of the stem 65, the lever 66 and the member 67 acting by wedging in the interior of the roller, the rotation of this latter. The amplitude of this rotation, and consequently the value of the interlineation, for each stroke of the key 63 may be adjusted by means of the device shown in Figure 4 and which consists of a lever 68 pivoted on a shaft 69 and of which the position, in relation to a graduated scale, may be fixed by means of a set screw 70.

This device enables the roller 62 to be turned either forwardly or backwardly. This result is obtained in a very simple manner by changing the point of attachment, on the crank 66, of the return spring 71 of the member 67. In fact if the spring 71 is attached, as shown in Figure 4, the lowering of the key 63 produces the rotation of the roller 62 in the direction of the arrow. If on the contrary the spring 71 is attached at 72 the same movement of the key 63 produces the rotation of the roller in a direction opposite to that of the arrow.

The machine may be completed by a tabulating device similar to that provided in ordinary typewriters and which is particularly useful for forming tables, columns of figures and so forth, but it is not possible to utilize a tabulator bar with notches similar to that in typewriters, as the spacing of the letters traced by the machine may vary to a considerable extent and this constitutes one of the advantages of this machine. Figures 12–13 and 14–15 show two arrangements of tabulator bars particularly suitable to the machine forming the subject of the invention and by means of which it is possible to secure the sliders very efficiently at any suitable point of the said bars.

In the device of Figures 12 and 13, the tabulator bar 73 is screw threaded and is provided along its whole length with two opposed flattened portions. The sliders 74 are formed by screw threaded and cut washers as indicated in Figure 13. These washers are very readily mounted on the bar by reason of the said flattened portions and when they have been moved to the positions which they are adapted to occupy according to the nature of the work to be executed they are locked by a movement of rotation of 90°.

The device in Figures 14 and 15 consists of a tube 75 cut open along its whole length and provided with holes or grooves 76 on each side in a plane at right angles to that of the cut. In the interior of the tube is disposed a rod 77 screw threaded at one of its ends so as to receive a milled nut 78 which bears against the end of the tube 75. This rod carries cams of which the projections engage with the holes 76. The sliders are formed by washers 79 which are threaded on the tube 75 and which are energetically tightened under the action of the said cams acting upon the inner walls of the tubes when screwing on the nut 78.

In the modification of the invention shown in Figures 16 to 18 the movements of the tracing member, instead of being actuated by the straight line movements of plates having cam grooves, are actuated by the rotation of cams having a suitable determined outline and corresponding to each of the letters (or signs) to be traced.

It will be understood that the machine is provided with a number of cams equal to that of the plates of the first form of construction. These cams are disposed in such a manner that those which correspond to the same direction of movement are opposite one another (see Figure 17). For each letter or sign the system is provided with three cams 80, 81 and 82 riveted together or connected by any suitable means. The cam 80 produces the contact and the clutching and consequently corresponds to the plate 5 of the first device. The cams 81 and 82 respectively produce the vertical movement and the horizontal movement.

In a machine provided with such a system of cams the lowering of a key produces the rotation of the corresponding group of cams. This rotation is transmitted to the tracing member by three transverse bars of which two 83 and 84 are provided with an internal rack bar (see Figure 17) and correspond with the cams 81 and 82. These bars are provided at each end with right angled bars which are pivoted at 85, one by a solid stem and the other by a tube concentric with said stem.

On a shaft 86, which has been drilled, may slide a pusher 87 which, under the action of a spring 88, bears on the said right angle bars. The play of this pusher gives the variations in size. The shaft 86 of the pusher drives the clutch drum.

Each element (that is to say each group of three cams 80, 81 and 82) turns loosely about a central tube 89. The cam 80 (Figure 18) is recessed at its centre and is provided with two notches 90, 91. In the interior of the tube 89 is provided a shaft 92 carrying teeth 93 passing through the tube and moving between the cams 81 and 82 in the recess formed in the central cam. The shaft 92 receives a rotary movement by the guide 94 (Figure 17) which is provided with a nut at one end and a return spring at the other. At each of its ends the shaft 92 carries a cam 95 of which the boss 95' corresponds with the position of the two notches of the cams 80.

When the tube 89 rotates, the elements (that is to say the groups of cams 80, 81 and 82) being held stationary, the tube drives by means of the teeth which pass therethrough and the guides 94, the shaft 92. When the boss 95' of the cam 95 comes into contact with the wheel 96 the shaft 92 descends and consequently the ends of the teeth describe the curve indicated in Figure 16.

It therefore suffices to push one element in such a manner that its point $\alpha$ comes to $\beta$ so that on the next passage of the teeth this element is driven.

The tracing member used in the machines which have been described is arranged as shown in Figures 19 to 21. The reference numerals in these figures indicate the elements previously described. As seen in Figure 19 the tracing membr 23 is similar to a drawing pen but with this peculiarity that the end of the branches 97 is trimmed in such a manner as to form two flat portions $d$, $e$ and $e$, $f$ of unequal length (see Figure 21). During operation the tracing member may be inclined in such a manner that it rests on the paper either with the flattened portion $d$, $e$ (for drawing thick lines), or with the flattened portion $e$, $f$ (if it is desired to draw finer lines).

The tracing member always starting from the base line of the letter or sign to be traced is only fed when it moves from the point A, the quantity of ink which it receives being proportional to the extent of this movement.

Figures 22 and 23 show diagrammatically how the various parts of the casing framework of the machine may be opened so as to give access to the members contained in the interior. The part carrying the keyboard (see Figure 22) pivots about the shaft which is common to the large pulleys, which permits of access to the guides and the balances without modifying the tension of the spring. The rear part is raised so as to permit of engaging the needles in the grooves. The lateral part at the right opens, as shown in Figure 23, so as to enable the plates to be changed either after wear or for changing the type of the character produced by the machine. This arrangement of the right side of the machine also permits of access to the transmission members of the whole. Finally a sliding door 105 permits of access to the whole of the mechanism.

Figures 24 and 25 show how the machine may be applied for tracing on sheets of very large dimensions. In this case the roller 62 of the machine previously described is replaced by a roller 106 of a length corresponding to the width of the paper P' which is used. This paper is spread on a second roller 107 by means of a suitable device 108, the whole being supported by a base 109. An endless cloth is preferably rolled on the rollers 106 and 107 under the paper. The unit composed by the rollers 106 and 107 and by the paper which they support may be slid in front of the machine M by means of sliders 110 which move on rods 111 secured to the base 109.

The operation for the variation of interlineation is effected in this case either by means of a transverse bar passing on the one hand on the roller 106 and passing through the operating rod of the bent lever 64 (see Figure 4) and passing on the other through the axis of the roller, or by means of a device mounted at the left on the plate connecting the two rollers 106 and 107.

Figures 26 to 28 show another modification of the machine in which the plates provided with the guide grooves, instead of being plane as in the methods of construction already described, form cylindrical surfaces. As will be seen in Figure 26, the machine thus modified comprises, in the same manner as in the machine in Figures 1 to 3 two sets of plates J, J' serving one for tracing the capital letters, for example, the other for tracing the small letters. Between these sets of plates are disposed needles 38 carried by members 112, 112' similar to the members 41, 41' of the first form of construction and operating in a similar manner in combination with a stop 42. The members 112, 112' are each mounted on a bar 113 adapted to oscillate about a shaft 114 common to all these members. On the other hand each key 40 acts through the medium of the bar 115 on the corresponding bar 113 so as to produce the movement of the needle carrying plates 112, 112'.

A transverse member 116 secured to the shaft 114 serves on the one hand to bring the bars 113 to their initial position (illustrated in full lines in Figure 26), during which movement the driving operation takes place, on the other hand to disengage the roller 62 by means of a balance device 117 which will be described in further detail hereinafter.

The machine constructed according to this form of construction is also provided with a differential device constructed in the following manner. A hand-piece 118 mounted on the front of the machine enables a pointer 119, forming a spring, to be turned in front of a dial plate 120. The hand-piece and the pointer are secured to the shaft 121 carrying a toothed wheel 122 which gears with a rack 123 cut on the tube 124 which may move vertically along the rod 125. This tube carries a bent plate 126 on which pivots at 127 a plate 128 provided at its end with a pivot or shaft 129 sliding in a groove provided in a plate 130.

The plate 128 also slides on a tenon secured to a plate 131 receiving at each of its ends the movement of two driving plates of the same nature. When the lower system is locked, the plate 128 receives the movement of the upper plate, this movement being reduced to one half. Inversely, when the upper system is locked, the said plate receives a movement, reduced to one half, from the lower plate.

The dial plate 120 is held in a stationary position by a spring, but its position, and consequently that of the whole forming the differential, may be modified temporarily by acting upon a pedal or key, which permits of modifying the spacing and the width of the letters during the stroke. When withdrawing the pedal of the key the whole returns to its original fixed position.

The formation of characters in this machine is effected in the following manner. The plate corresponding to the horizontal component imparts its movement to the arm 130 which drives during its movement a shaft 132 held by two supports and carrying at its end a lever arm 133. The lever 133 carries at its end, through the medium of a hinge, a rod 134 adapted to impart a horizontal movement to the tracing member 23.

The vertical movement is transmitted by the corresponding plate at 135 (Figure 28). It is transmitted by means of a rod 136 to the member 137 which pivots on the shaft 138 and which in turn, through the medium of a rod 139, imparts a vertical movement to the tracing member 23.

The mechanism adapted to produce the disengagement of the roller is arranged in the following manner. The shaft 132 carries a lever 141 which by means of a rod 142 and a crank 143 causes the snail cam 144 to turn an extent equal to the maximum width of the letter formed. The said cam pivots on a shaft carried by a lever 145 and comes into contact, with slight friction, with the drum 146 which tends to turn under the action of a spring or weight 147 attached to a cord wound on the shaft 148 of the said drum.

A brake 149 holds the drum stationary and consequently opposes the action of the weight 147. When the cam 144 has pivoted a determined extent the balance 116, 117 exerts a pull on the rod 150. The first portion of this movement produces the tension of the spring 151 and ensures intimate contact between the cam 144 and the drum 146. At the end of the stroke the nut 152 screwing on the rod 150 disengages the brake 149 which enables the drum 146 to turn under the action of the weight 147 (or of a spring motor). During this movement the drum drives the cam up to the point of contact of the two tangential portions. At this moment the rod 150 being released, the brake 149 acts before the spring 151 has been able to expand.

The drum 146 drives a pulley 153 around which is wound the traction thread of the roller 62.

As in the form of construction described in the first instance the machine is provided with an adjustable tabulator 154.

Figures 29 to 31 show diagrammatically a simplified form of construction of the invention in which the keyboard is omitted. the control of the movements of the tracing member being obtained by engaging a single movable key provided with a needle in a suitable groove of the upper plate and moving the said key along said groove. This simplified machine may produce for example a tracing of writing on drawings or for any other similar applications.

This machine is provided with a single set of five plates similar to the set of plates of the first form of construction, namely an upper guide plate with straight grooves, a plate with cam grooves for the vertical movement of the tracing member, a plate with cam grooves for the horizontal movement of the tracing member, a contact-clutching plate, and a lower plate with straight guide grooves.

The lower guide plate 1" and the upper guide plate 2" may, as shown in Figure 30, form a box in the interior of which are located the movable plates. These are indicated in Figure 30 by 5", 6", 7".

The control of the movements is produced by the movement along one of the guide grooves of the plate 2", of the needle 38" carried by the key 155. This needle may be withdrawn in such a manner that the operator may engage it with those grooves which are suitable.

The transmission of the horizontal movement is ensured by a set of levers 156 (hinged at 159 to a corresponding driving plate), 157, 158 transmitting the movement by means of cranks 160 and 161 to the point 162 of a slit bar 163 adapted to slide in the plane of the machine in any direction by reason of the two plates 164 soldered at each of its ends at right angles to its axis and moving in the grooves 165 of a box 166.

This device enables the width of the letters to be varied. For this purpose it suffices to modify the position of the hinging point 167 of the lever 157 in the slider in an arc of a graduated circle of lever 156.

The transmission of the vertical movement is ensured by the set of levers 168 (hinged at 172 to the corresponding driving plate), 169, 170, 171 this latter actuating at 173 the arms 174 which effects the movement of the bar 163 in the vertical direction. The arms 174 are carried by a shaft 175 pivoting in the boxes 166 disposed at each end of the machine.

The same device permits of varying the height of the letters by moving the hinge point 176 of the lever 169 on the slider in an arc of a circle of lever 168.

The operation of the contact and the disengagement of the tracing member 23 is effected by the arms 177 secured to the shaft 178 which pivots in the boxes 166, the said arms acting upon a rod 179 secured to the said arms and acting directly on the support 180 of the tracing member. A square balancing device 181 pushed by the contact-plate 5" transmits the movement of this plate to the arm 177 and to the rod 179. A spring 182 holds the balance 181, the arms 177 and the rod 179 in the position of rest.

In all the forms of construction of the invention which have been described, the arrangement of the driving plates or plates with cam grooves may be such that the needle brings into play any suitable number of superposed plates each representing a different type of character, the contact plate being alone for these different types. This arrangement permits particularly of placing the capital letters and the small letters in the same set of plates. It also lends itself to the tracing of fancy letters.

Although the methods of construction of the invention described here refer to the case of machines specially suited for making graphical symbols, designs and the like, it will be understood that the invention is not limited to this particular application and that the general means constituting the essential features of the invention may be applied wherever it is necessary to cause any instrument to describe a determined movement starting from a general straight line movement.

What I claim is:

1. A machine for making graphical symbols, designs, and the like, including plates mounted for movement in definite directions, said plates being provided with intersecting cam tracks, means cooperating with said plates for shifting the point of intersection of said cam tracks to produce relative movement of said plates in their respective directions, guiding means for determining a definite path in which said point of intersection shall move when shifted, thereby producing a predetermined variation in the extent of movement of said plates, means operably related to said plates for composing the simultaneous movements thereof into a resultant line of movement of a desired direction and extent to include the symbol or design to be made, and a scriber operably related to said composing means, to which said resultant movement is transmitted.

2. A machine for making graphical symbols, designs, and the like, including plates mounted for movement in definite directions, said plates being provided with intersecting cam grooves, means extending through said cam grooves at their point of intersection and movable to shift said point of intersection to produce relative movement of said plates in their respective directions, guiding means for determining a definite path of movement for said shifting means thereby producing a predetermined variation in the extent of movement of said plates, means operably related to said plates for composing the simultaneous movements thereof into a resultant line of movement of a desired direction and extent to include the symbol or design to be made, and a scriber operably related to said composing means, to which said resultant movement is transmitted.

3. A machine for making graphical symbols, designs, and the like including plates mounted for movement in definite directions, said plates being provided with intersecting cam tracks, means cooperating with said plates for shifting the point of intersection of said cam tracks to produce relative movement of said plates in their respective directions, said means including an element coinciding with said point of intersection, guiding means for said element including a plate provided with a groove in which said element is guided for determining a definite path in which said point of intersection shall move when shifted, thereby producing a predetermined variation in the extent of movement of said plates, means operably related to said plates for composing the simultaneous movements thereof into a resultant line of movement of a desired direction and extent to include the symbol or design to be made, and a scriber, operably related to said composing means, to which said resultant movement is transmitted.

4. A machine for making graphical symbols, designs, and the like, including plates mounted for movement in definite directions, said plates being provided with intersecting cam grooves, means extending through said cam grooves at their point of intersection and movable to shift said point of intersection to produce relative movement of said plates in their respective directions, guiding means for determining a definite path of movement for said shifting means including a plate having a slot in which said means is guided, thereby producing a predetermined variation in the extent of movement of said first-mentioned plates, means operably related to said plates for composing the simultaneous movements thereof into a resultant line of movement of a desired direction and extent to include the symbol or design to be made, and a scriber, operably related to said composing means, to which said resultant movement is transmitted.

5. A machine for making graphical symbols, designs, and the like, including plates mounted for movement in definite directions, said plates being provided with intersecting cam tracks, means cooperating with said plates for shifting the point of intersection of said cam tracks to produce relative movement of said plates in their respective directions, guiding means for determining a definite path in which said point of intersection shall move when shifted, thereby producing a predetermined variation in the extent of movement of said plates, means operably related to said plates for composing the simultaneous movements thereof into a resultant line of movement of a desired direction and extent to include the symbol or design to be made, a scriber operably related to said composing means, to which said resultant movement is transmitted, and means for varying the dimensions of the symbol or design.

6. A machine for making graphical symbols, designs, and the like, including plates mounted for movement in definite directions, said plates being provided with intersecting cam tracks, means cooperating with said plates for shifting the point of intersection of said cam tracks to produce relative movement of said plates in their respective directions, guiding means for determining a definite path in which said point of intersection shall move when shifted, thereby producing a predetermined variation in the extent of movement of said plates, means operably related to said plates for composing the simultaneous movements thereof into a resultant line of movement of a desired direction and extent to include the symbol or design to be made, a scriber operably related to said composing means, to which said resultant movement is transmitted, and means for varying the ratio of the length and breadth dimensions of the symbol or design.

7. A machine for making graphical symbols, designs and the like, including plates mounted for movement in definite directions, said plates being provided with cam tracks intersecting at a point, means cooperating with said plates for shifting the point of intersection of said cam tracks to produce relative conjunctive movement of said plates in their respective directions, guiding means for determining a definite path in which said point of intersection shall move when shifted thereby producing a predetermined variation in the extent of movement of said plates, means operably related to certain of said plates for composing the simultaneous movements thereof into a resultant movement having a direction and extent to include the symbol or design which it is desired to make, a scriber cooperating with said means to which the resultant motion is transmitted, and means operably related to another of said plates for bringing said scriber and the medium upon which the symbol or design is to be made into operative relation, during those portions of its movement which correspond to the symbol or design to be made.

In testimony whereof I have signed my name to this specification.

MARCEL MÉE.